(12) United States Patent
Bahar

(10) Patent No.: US 8,769,972 B2
(45) Date of Patent: *Jul. 8, 2014

(54) ELECTROCHEMICAL COMPRESSOR AND REFRIGERATION SYSTEM

(75) Inventor: Bamdad Bahar, Chester, MD (US)

(73) Assignee: Xergy Inc, Georgetown, DE (US)

(*) Notice: Subject to any disclaimer, the term of this patent is extended or adjusted under 35 U.S.C. 154(b) by 1260 days.

This patent is subject to a terminal disclaimer.

(21) Appl. No.: 12/626,416

(22) Filed: Nov. 25, 2009

(65) Prior Publication Data

US 2010/0132386 A1  Jun. 3, 2010

Related U.S. Application Data

(60) Provisional application No. 61/200,714, filed on Dec. 2, 2008.

(51) Int. Cl.
- *F25B 1/00* (2006.01)
- *F25B 23/00* (2006.01)
- *F04B 37/02* (2006.01)
- *C25B 9/00* (2006.01)

(52) U.S. Cl.
USPC .................. 62/115; 62/467; 417/48; 204/266

(58) Field of Classification Search
USPC .............. 62/115, 238.2, 238.6, 500; 204/266; 205/765; 417/48
See application file for complete search history.

(56) References Cited

U.S. PATENT DOCUMENTS

| | | |
|---|---|---|
| 2,913,511 A | 11/1959 | Grubb, Jr. |
| 3,432,355 A | 3/1969 | Niedrach et al. |
| 3,489,670 A | 1/1970 | Maget |
| 4,118,299 A | 10/1978 | Maget |
| 4,406,135 A | 9/1983 | Rojey et al. |
| 4,523,635 A | 6/1985 | Nishizaki et al. |
| 4,569,207 A | 2/1986 | James |

(Continued)

FOREIGN PATENT DOCUMENTS

WO  2008007108 A1  1/2008

OTHER PUBLICATIONS

"From Maget to Today," David Bloomfield, presented at a local meeting of the American Institute of Chemical Engineers (AIChE) in Boston, MA on Oct. 31, 2002, 26 pages.

(Continued)

*Primary Examiner* — Brandon M Rosati
*Assistant Examiner* — Elizabeth Martin
(74) *Attorney, Agent, or Firm* — Invention To Patent Services; Alex R. Hobson

(57) ABSTRACT

A refrigeration system defines a closed loop that contains a working fluid, at least part of the working fluid being circulated through the closed loop. The refrigeration system includes a first heat transfer device that transfers heat from the first heat reservoir to the working fluid, a second heat transfer device that transfers heat from the working fluid to the second heat reservoir, and an electrochemical compressor between the first and second heat transfer devices. The electrochemical compressor includes one or more electrochemical cells electrically connected to each other through a power supply, each electrochemical cell including a gas pervious anode, a gas pervious cathode, and an electrolytic membrane disposed between and in intimate electrical contact with the cathode and the anode. The working fluid includes a condensable refrigerant that bypasses the electrochemical process; and an electrochemically active fluid that participates in the electrochemical process within the electrochemical compressor.

15 Claims, 7 Drawing Sheets

(56) References Cited

U.S. PATENT DOCUMENTS

| | | | |
|---|---|---|---|
| 4,593,534 A * | 6/1986 | Bloomfield | 62/201 |
| 4,671,080 A | 6/1987 | Gross | |
| 4,829,785 A | 5/1989 | Hersey | |
| 4,865,701 A | 9/1989 | Beck et al. | |
| 5,024,060 A | 6/1991 | Trusch | |
| 5,209,081 A | 5/1993 | Matsuoka | |
| 5,523,181 A | 6/1996 | Stonehart et al. | |
| 5,547,551 A | 8/1996 | Bahar et al. | |
| 5,599,614 A | 2/1997 | Bahar et al. | |
| 5,635,041 A | 6/1997 | Bahar et al. | |
| 5,746,064 A | 5/1998 | Tsenter | |
| 5,768,906 A | 6/1998 | Tsenter | |
| 5,900,031 A | 5/1999 | Bloomfield | |
| 5,941,079 A | 8/1999 | Bowman et al. | |
| 5,976,724 A | 11/1999 | Bloomfield | |
| 5,993,619 A | 11/1999 | Bloomfield et al. | |
| 6,068,673 A | 5/2000 | Bloomfield | |
| 6,167,721 B1 | 1/2001 | Tsenter | |
| 6,242,135 B1 | 6/2001 | Mushiake | |
| 6,254,978 B1 | 7/2001 | Bahar et al. | |
| 6,321,561 B1 | 11/2001 | Maget | |
| 6,425,440 B1 | 7/2002 | Tsenter et al. | |
| 6,553,771 B2 * | 4/2003 | Tsenter | 62/46.2 |
| 6,635,384 B2 | 10/2003 | Bahar et al. | |
| 6,651,451 B2 * | 11/2003 | Cho et al. | 62/197 |
| 7,470,267 B2 | 12/2008 | Joshi et al. | |
| 7,896,867 B2 | 3/2011 | Gordon et al. | |
| 8,088,535 B2 | 1/2012 | Sommer et al. | |
| 2003/0196893 A1 * | 10/2003 | McElroy et al. | 204/266 |
| 2004/0142215 A1 | 7/2004 | Barbir et al. | |
| 2004/0211679 A1 | 10/2004 | Wong et al. | |
| 2004/0253494 A1 | 12/2004 | Maruyama et al. | |
| 2006/0101830 A1 | 5/2006 | Cohen et al. | |
| 2006/0254286 A1 | 11/2006 | Johnson et al. | |

OTHER PUBLICATIONS

"Engineering a Membrane Electrode Assembly," John W. Weidner et al., The Electrochemical Society Interface, Winter, 2003, pp. 40-43.

Technical Specifications for "HOGEN Hydrogen Generation Systems," Proton Energy Systems, Inc., Oct. 2008, 2 pages.

"Teledyne Titan(TM) HM Generator Series Hydrogen/Oxygen Gas Systems," Teledyne Energy Systems, Inc., Jun. 2007, 2 pages.

PCT International Search Report mailed on Mar. 16, 2010 in Application No. PCT/US2009/065951, issued by the Ho Jin Kong of the Korean Intellectual Property Office (3 pages).

Written Opinion of the International Searching Authority mailed on Mar. 16, 2010 in Application No. PCT/US2009/065951, issued by Ho Jin Kong of the Korean Intellectual Property Office (4 pages).

Ali Kilicarslan et al., "A comparative study of water as a refrigerant with some current refrigerants," Int. J. Energy Res. 2005; 29:947-959. Published online Jul. 18, 2005 in Wiley InterScience (www.interscience.wiley.com).

* cited by examiner

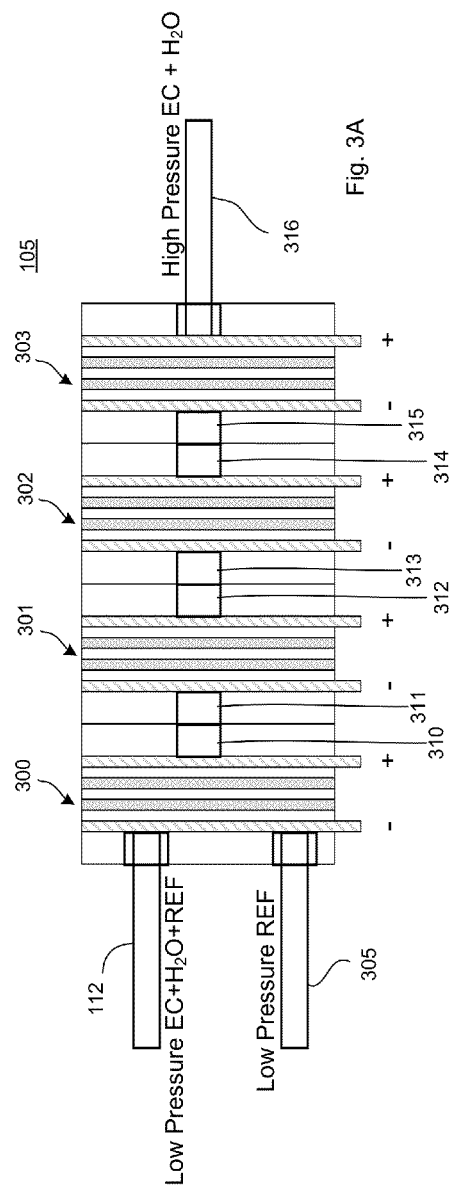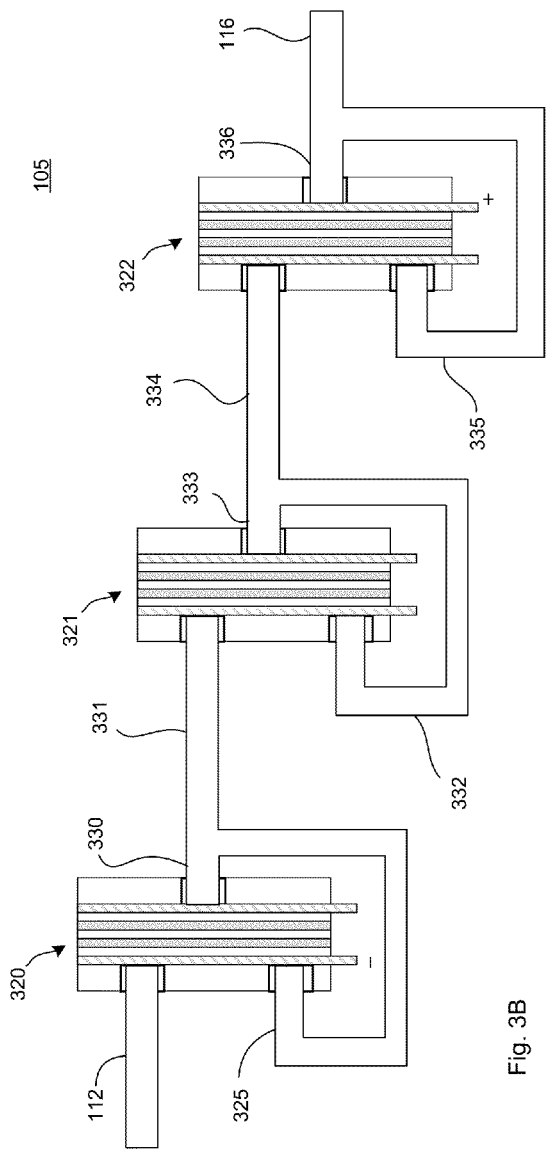

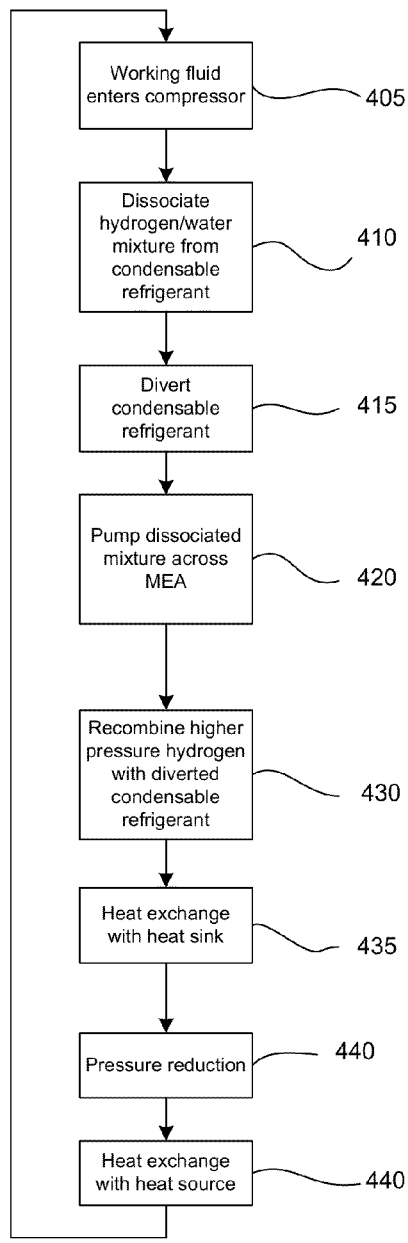
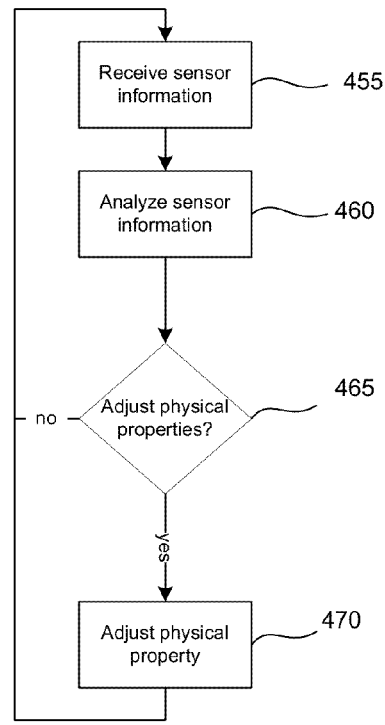
Fig. 4A
Fig. 4B

ELECTROCHEMICAL COMPRESSOR AND REFRIGERATION SYSTEM

CROSS-REFERENCE TO RELATED APPLICATION

This application claims priority to U.S. Application No. 61/200,714, filed on Dec. 2, 2008 and entitled "Electrochemical Compressor and Heat Pump System," which is incorporated herein by reference in its entirety.

TECHNICAL FIELD

The disclosed subject matter relates to a refrigeration system that includes a vapor-compression refrigeration cycle that includes an electrochemical compressor configured to transfer a refrigerant.

BACKGROUND

The function of both refrigeration cycles and heat pumps is to remove heat from a heat source or reservoir at low temperature and to reject the heat to a heat sink or reservoir at high temperature. While many thermodynamic effects have been exploited in the development of heat pumps and refrigeration cycles, the most popular today is the vapor compression approach. This approach is sometimes called mechanical refrigeration because a mechanical compressor is used in the cycle.

Mechanical compressors account for approximately 30% of a household's energy requirements and thus consume a substantial portion of most utilities' base load power. Any improvement in efficiency related to compressor performance can have significant benefits in terms of energy savings and thus have significant positive environmental impact. In addition, there are increasing thermal management problems in electronic circuits, which require smaller heat pumping devices with greater thermal management capabilities.

Vapor compression refrigeration cycles generally contain five important components. The first is a mechanical compressor that is used to pressurize a gaseous working fluid. After proceeding through the compressor, the hot pressurized working fluid is condensed in a condenser. The latent heat of vaporization of the working fluid is given up to a high temperature reservoir often called the sink. The liquefied working fluid is then expanded at substantially constant enthalpy in a thermal expansion valve or orifice. The cooled liquid working fluid is then passed through an evaporator. In the evaporator, the working fluid absorbs its latent heat of vaporization from a low temperature reservoir often called a source. The last element in the vapor compression refrigeration cycle is the working fluid itself.

In conventional vapor compression cycles, the working fluid selection is based on the properties of the fluid and the temperatures of the heat source and sink. The factors in the selection include the specific heat of the working fluid, its latent heat of vaporization, its specific volume and its safety. The selection of the working fluid affects the coefficient of performance of the cycle.

For a refrigeration cycle operating between a lower limit, or source temperature, and an upper limit, or sink temperature, the maximum efficiency of the cycle is limited to the Carnot efficiency. The efficiency of a refrigeration cycle is generally defined by its coefficient of performance, which is the quotient of the heat absorbed from the sink divided by the net work input required by the cycle.

SUMMARY

In one general aspect, a refrigeration system conveys heat from a first heat reservoir at a relatively low temperature to a second heat reservoir at relatively high temperature. The refrigeration system defines a closed loop that contains a working fluid, at least part of the working fluid being circulated through the closed loop. The refrigeration system includes a first heat transfer device that transfers heat from the first heat reservoir to the working fluid, a second heat transfer device that transfers heat from the working fluid to the second heat reservoir, an expansion valve between the first and second heat transfer devices that reduces pressure of the working fluid, and an electrochemical compressor between the first and second heat transfer devices. The electrochemical compressor includes one or more electrochemical cells electrically connected to each other through a power supply, each electrochemical cell including a gas pervious anode, a gas pervious cathode, and an electrolytic membrane disposed between and in intimate electrical contact with the cathode and the anode.

Implementations can include one or more of the following features. For example, the working fluid can include a condensable refrigerant that bypasses the electrochemical process; and an electrochemically active fluid that participates in the electrochemical process within the electrochemical compressor.

In other implementations, the working fluid can include a condensable refrigerant; water; and an electrochemically active fluid. In other implementations, the working fluid includes a condensable refrigerant that is not water; and an electrochemically active fluid. In some implementations, the condensable refrigerant does not participate in the electrochemical process.

The working fluid can include carbon dioxide. The working fluid can include a fluorocarbon gas. The electrolytic membrane can include a solid electrolyte, for example, a gel.

The refrigeration system can include a temperature sensor thermally coupled to one or more of the working fluid, the first heat transfer device, and the second heat transfer device. The first heat transfer device can include a condenser. The second heat transfer device can include an evaporator.

The electrochemical compressor can include a cathode gas space on a nonelectrolyte side of the cathode; and an anode gas space on a nonelectrolyte side of the anode. The electrochemical compressor can include a first electrochemically active route that traverses the anode and cathode; a second non-electrochemical route that bypasses the anode and cathode; and a combiner that combines the components that have traversed the first and second routes.

The refrigeration system can also include a mechanical compressor. The mechanical compressor can be in series with the electrochemical compressor. The mechanical compressor can be between the electrochemical compressor and the first heat transfer device. The mechanical compressor can be between the electrochemical compressor and second heat transfer device.

In another general aspect, an electrochemical compressor includes an inlet fluidly coupled to an evaporator to receive a working fluid that comprises a condensable refrigerant and an electrochemically active fluid; an outlet fluidly coupled to a condenser; and one or more electrochemical cells electrically connected to each other through a power supply. Each electrochemical cell includes a gas pervious anode, a gas pervious cathode, and an electrolytic membrane disposed between and in intimate electrical contact with the cathode and the anode. The anode, the cathode, and the electrolytic membrane are configured to pass the electrochemically active fluid. The electrochemical cell is configured to disassociate the condensable refrigerant from the electrochemically active fluid to prevent the condensable refrigerant from passing through the anode, the cathode, and the electrolytic membrane. The electrolytic membrane includes a membrane having a porous microstructure and an ion exchange material impregnated throughout the membrane.

Implementations can include one or more of the following features. For example, the impregnated membrane can have a Gurley number of greater than 10,000 seconds.

The ion exchange membrane can be able to withstand a pressure gradient between a side adjacent the anode and a side adjacent the cathode. The ion exchange membrane can be able to withstand a pressure gradient of at least 30 psi between a side adjacent the anode and a side adjacent the cathode.

The ion exchange membrane can include a synthetic fluoropolymer of tetrafluoroethylene. The synthetic fluoropolymer can be an expanded polytetrafluoroethylene having a porous microstructure of polymeric fibrils. The ion exchange material can substantially impregnate the membrane so as to render an interior volume of the membrane substantially occlusive. The ion exchange material can be impermeable to gas. The ion exchange material can be permeable to gas. The ion exchange material can be selected from a group consisting of perfluorinated sulfonic acid resin, perfluorinated carboxylic acid resin, polyvinyl alcohol, divinyl benzene, styrene-based polymers, and metal salts with or without a polymer.

The anode, the cathode, and the electrolytic membrane can be configured to pass the electrochemically active fluid if the working fluid includes less than 50% of water.

The one or more electrochemical cells can be connected in parallel with each other.

A first electrochemically active route can be defined by the anode, the electrolytic membrane, and the cathode; and a second non-electrochemical route bypasses the anode, the electrolytic membrane, and the cathode.

The compressor can include a combiner that combines the components of the working fluid that have traversed the first, route, the second route, or both the first and second routes.

The ion exchange material can include a liquid electrolyte embedded in a matrix. The ion exchange material can include an anionic exchange membrane and the anode gas space operates at a higher pressure than the cathode gas space.

The porous membrane can have a total thickness of less than 0.025 mm.

In another general aspect, a method of refrigeration includes conveying heat from a first heat reservoir at a relatively low temperature to a second heat reservoir at relatively high temperature by circulating a working fluid through a closed loop that is thermally coupled to the first heat reservoir at a first portion and is thermally coupled to the second heat reservoir at a second portion. The conveying includes transferring heat from the working fluid at the second loop portion to the second heat reservoir including liquefying at least some of the working fluid; reducing a pressure of the at least partially liquefied working fluid by expanding the working fluid at a substantially constant enthalpy; and transferring heat from the first heat reservoir to the working fluid at the first loop portion including vaporizing at least some of the working fluid. The conveying also includes increasing a pressure of the working fluid by dissociating an electrochemically active fluid from a condensable refrigerant within the working fluid to enable the condensable refrigerant to separate from the electrochemically active fluid, electrochemically ionizing the electrochemically active fluid by stripping charged particles from the electrochemically active fluid, enabling the ionized electrochemically active fluid to pass through an electrolytic membrane, pumping the charged particles to create an electric potential gradient across the electrolytic membrane, pumping the ionized electrochemically active fluid across the electrolytic membrane using the electric potential gradient, electrochemically de-ionizing the electrochemically active fluid by combining the pumped charged particles with the ionized electrochemically active fluid, and pressuring the de-ionized electrochemically active fluid. The conveying further includes re-associating the pressurized de-ionized electrochemically active fluid with the condensable refrigerant to form a pressurized working fluid that flows to the second loop portion.

Implementations can include one or more of the following features. For example, dissociating the electrochemically active fluid from the condensable refrigerant can include passing the working fluid through an anode gas space to thereby dissociate the electrochemically active fluid from the condensable refrigerant within the working fluid. Electrochemically ionizing the electrochemically active fluid by stripping charged particles from the electrochemically active fluid can include electrochemically ionizing the electrochemically active fluid within a gas pervious anode adjacent the anode gas space. Enabling the ionized electrochemically active fluid to pass through the electrolytic membrane can include enabling the ionized electrochemically active fluid to enter the electrolytic membrane that is disposed between the gas pervious anode and a gas pervious cathode.

Pumping the charged particles to create the electric potential gradient across the electrolytic membrane can include pumping electrons from the gas pervious anode to the gas pervious cathode to create the electric potential gradient between the gas pervious anode and the gas pervious cathode, and pumping the ionized electrochemically active fluid across the electrolytic membrane using the electric potential gradient can include pumping the ionized electrochemically active fluid to the gas pervious cathode.

Electrochemically de-ionizing the electrochemically active fluid can include combining the pumped charged particles in the gas pervious cathode with the ionized electrochemically active fluid, and pressuring the de-ionized electrochemically active fluid can include pressuring the de-ionized electrochemically active fluid within a cathode gas space that is adjacent the gas pervious cathode and is maintained at a higher pressure than the anode gas space.

The method can also include controlling the amount of heat conveyed by varying one or more of a current and a voltage applied to pump the charged particles to create the electric potential gradient across the electrolytic membrane.

There are several benefits to using carbon dioxide as a refrigerant in a refrigeration system. If carbon dioxide manages to leak out of the system, and make its way up to the ozone layer, the ultraviolet radiation does not break up the molecule to release highly active chlorine radicals that help to deplete the ozone layer. Therefore, carbon dioxide does not deplete the ozone layer.

Moreover, while many have noted a few problems associated with the use of carbon dioxide in refrigeration systems, for example, requiring operating at higher pressure and higher compressor temperature, these operating requirements are found to be more advantageous in automotive applications. The very high cycle pressure results in a high fluid density throughout the cycle, allowing miniaturization of the systems for the same heat pumping power requirements. Furthermore, the high outlet temperature of the compressor can permit faster defrosting of automobile windshields and can even be used for combined space heating and hot water heating in home usage. In fuel cell applications involving the production of hydrogen from hydrocarbon sources such as natural gas, hydrogen gas is fed to the electrode assembly as a mixed gas stream with carbon dioxide present (typically referred to as reformate). Thus, electrodes have been developed and are commercially available (such as W. L. Gore & Associates Inc. series 56 PRIMEA assembly) with suitable electrochemical performance with mixed hydrogen and carbon dioxide gas streams.

The vapor compression refrigeration system uses an electrochemical compressor and therefore is modular (that is, it can be of different sizes without limitation). The vapor compression refrigeration system is electrically driven and thus fully electronically controlled. The vapor compression refrigeration system can be considered essentially noiseless, and thus is less noisy than conventional mechanical refrigeration systems. The vapor compression refrigeration system is more efficient than conventional mechanical refrigeration systems.

DRAWING DESCRIPTION

FIGS. 3A-3C are block diagrams of electrochemical compressors that include a plurality of electrochemical cells and can be used in the refrigeration system of FIG. 1.

FIG. 4A is a flow chart of a procedure performed by the refrigeration system of FIG. 1.

FIG. 4B is a flow chart of a procedure performed by a control system within the refrigeration system of FIG. 1.

DESCRIPTION

Figure 1:
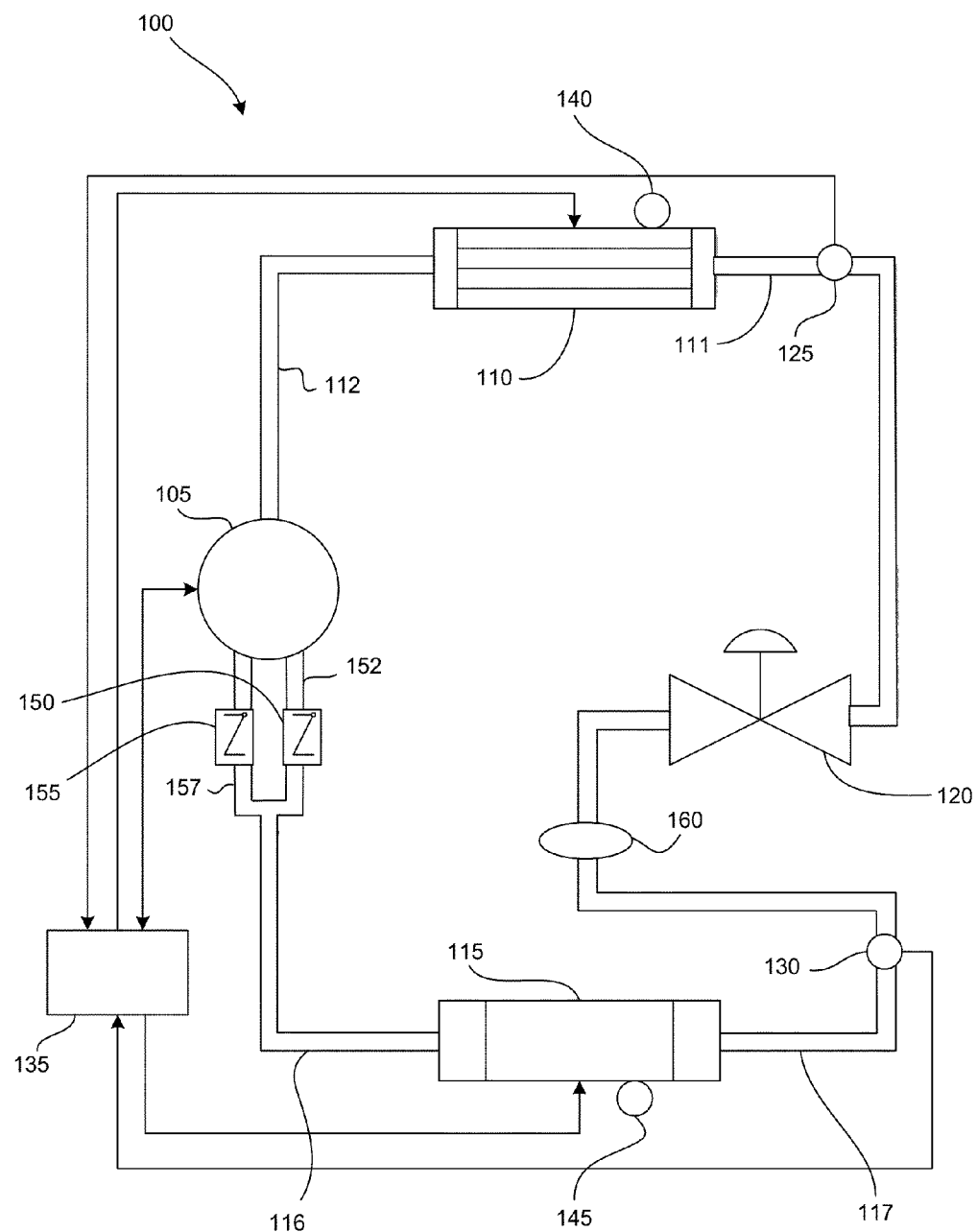
FIG. 1 is block diagram of an exemplary refrigeration system that defines a closed loop that contains a working fluid and includes an electrochemical compressor.

Referring to FIG. 1, an exemplary refrigeration system 100 defines a closed loop that contains a working fluid. The system 100 includes an electrochemical compressor 105 that lacks moving parts, a first heat transfer device 110 that transfers heat from a first heat reservoir (a heat source or object to be cooled) to the working fluid, a second heat transfer device 115 that transfers heat from the working fluid to a second heat reservoir (a heat sink), and a thermostatic expansion valve 120 between the first and second heat transfer devices. The system 100 also includes one or more sensors (for example, temperature sensors) 125, 130 placed along flow paths between components of the system 100 to provide feedback to a control system 135 that is also coupled to the compressor 105, the first heat transfer device 110, and the second heat transfer device 115.

The working fluid contained within the closed loop of the system 100 includes at least a first component that is electrochemically active and therefore takes part in the electrochemical process within the compressor 105. The working fluid includes at least a second component that is a condensable refrigerant that can be used for the heat pump application under consideration. The condensable refrigerant is any suitable condensable composition that does not include water. As discussed below, the condensable refrigerant bypasses the electrochemical process within the compressor 105.

Additionally, the working fluid includes a third component that is water to hydrate an ion exchange membrane within the compressor 105 (as discussed below). Water can be considered a contaminant of some standard refrigerants, and it can negatively impact heat exchange performance of the refrigerant. Thus water as the third component of the working fluid can be reduced for example, to a minimal amount that is needed to provide enough hydration to one or more components of the compressor 105.

In some implementations, the first component (which is electrochemically active) includes hydrogen ($H_2$) and the second component (which is a condensable refrigerant) includes carbon dioxide ($CO_2$). In this implementation, the components are present in the proportion of approximately one part hydrogen and four parts of carbon dioxide by volume. The relative proportions of hydrogen and carbon dioxide are governed by the desired relative efficiency of the electrochemical compressor 105 and the system 100. The quantity of water maintained in the working fluid is governed by the thickness of membranes employed in the compressor 105, the equivalent weight (acidity) of the ion exchange media employed in the compressor 105, and the amount of hydrogen in the system 100. Thinner membranes of higher equivalent weight (that is, lower acidity) employed in systems with lower proton capability require less water. In general, the working fluid includes less than 50% of water, but can include less than 20%, less than 10%, or less than 1% water, depending on the application.

It should be noted that while hydrogen is being used primarily as the electrochemically active component of the working fluid, hydrogen also possesses useful heat transfer properties. Hydrogen's low density, high specific heat, and thermal conductivity make it a superior coolant. Hydrogen gas can be used as the heat transfer medium industrially in, for example, turbine generators. The presence of hydrogen gas within the working fluid thus enhances the performance of the condensable refrigerant; and provides thermal exchange opportunities at points away from thermally conductive surfaces of the fluid conduits and the heat transfer devices.

The first heat transfer device 110 includes an evaporator that acts as a heat exchanger that places the working fluid in a heat exchange relationship with the first heat reservoir or source of heat (for example, a source fluid). The first heat transfer device 110 includes inlet and outlet ports coupled to respective conduits 111, 112 that contain the working fluid of the system 100. The second heat transfer device 115 includes a condenser that acts as a heat exchanger that places the working fluid in a heat exchange relationship with the second heat reservoir or heat sink (for example, a sink fluid). The second heat transfer device 115 includes inlet and outlet ports coupled to respective conduits 116, 117 that contain the working fluid of the system 100. The expansion valve 120 is an orifice that is able controls the amount of working fluid flow. The valve 120 can include a temperature sensing bulb filled with a similar gas as in the working fluid that causes the valve to open against the spring pressure in the valve body as the temperature on the bulb increases. As temperatures in the evaporator 110 decrease, so does the pressure in the bulb and therefore on the spring causing the valve to close.

Figure 2:
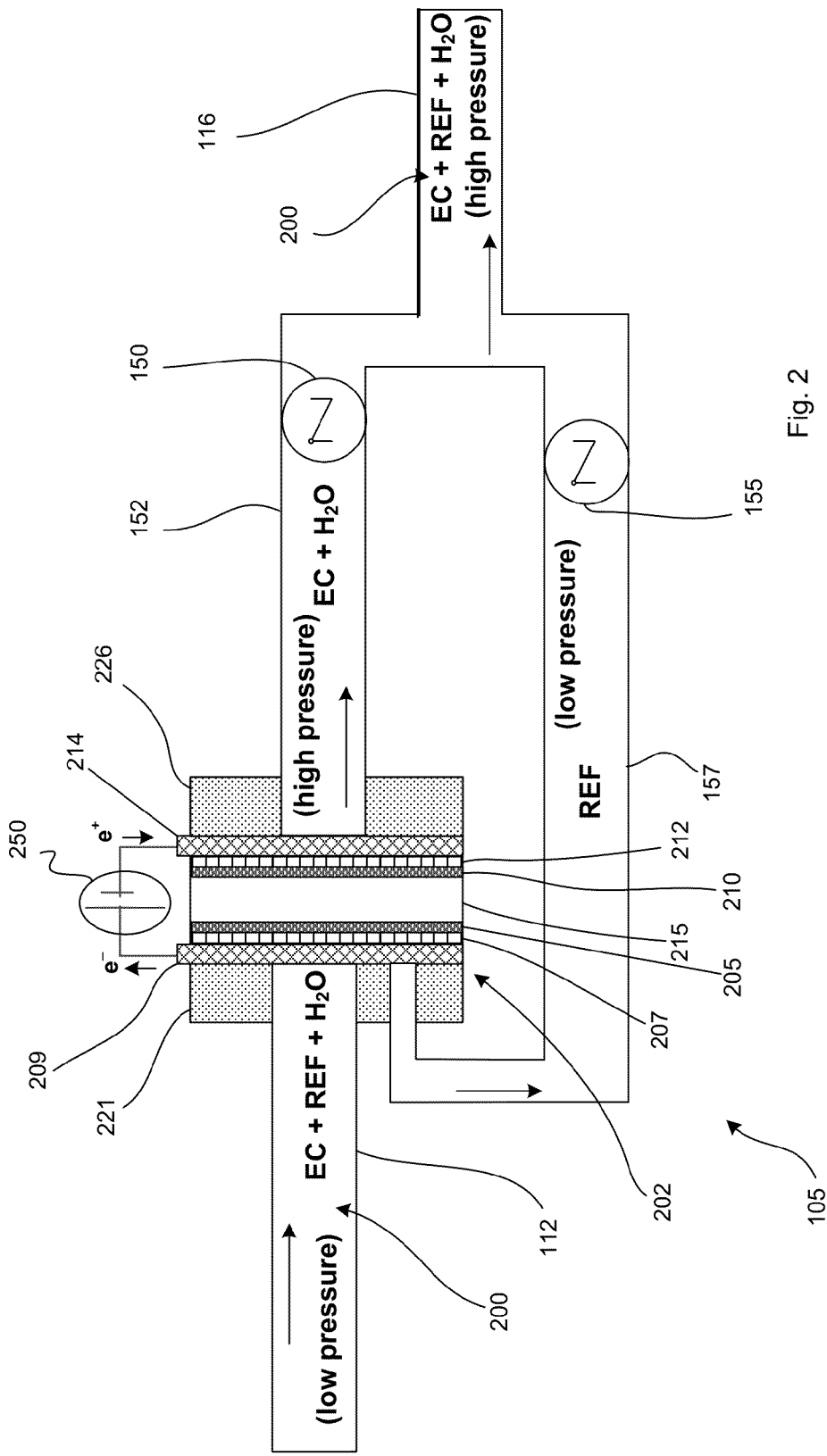
FIG. 2 is block diagram of an electrochemical compressor and components of a working fluid that can be used in the refrigeration system of FIG. 1.

Referring also to FIG. 2, the electrochemical compressor 105 is a device that raises the pressure of a component of the working fluid 200 by an electrochemical process. Accordingly, at least one component of the working fluid must be electrochemically active. In particular, the electrochemically active component (the first component) must be ionizable. For example, the electrochemically active component is oxidizable at a gas pervious anode 205 of the compressor 105 and is reducible at a gas pervious cathode 210 of the compressor 105.

Figure 3C:
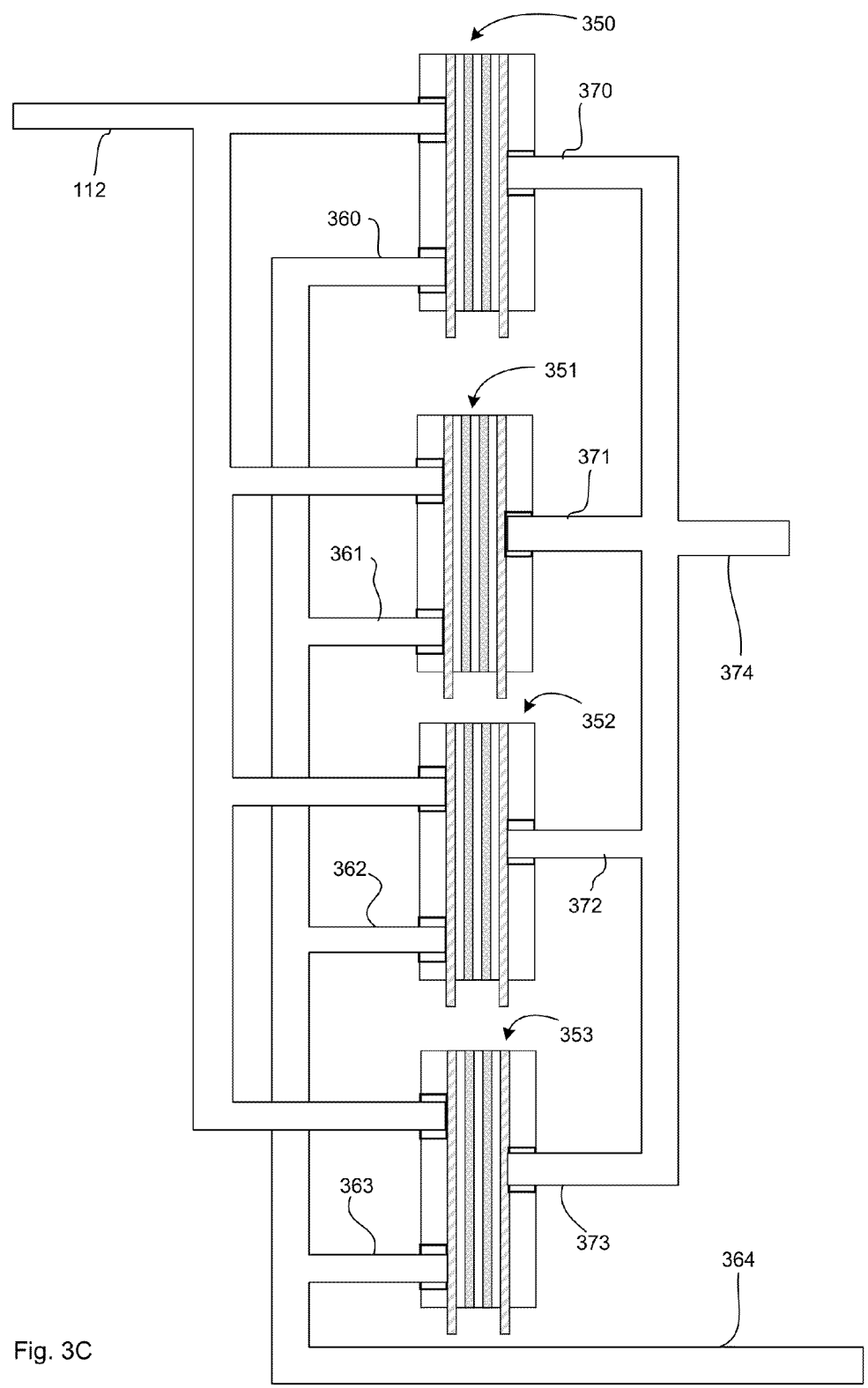

The design in which the compressor 105 includes only one exemplary cell 202 is shown in FIG. 2. However, the electrochemical compressor 105 can include a plurality of electrochemical cells 302, as shown in FIGS. 3A-C. In some implementations, the electrochemical compressor 105 is an annular stack of electrochemical cells electrically connected in series such as, for example, the cells generally described in U.S. Pat. No. 2,913,511 (Grubb); in U.S. Pat. No. 3,432,355 (Neidrach); and in U.S. Pat. No. 3,489,670 (Maget).

Each cell 202 includes the anode 205, where the electrochemically active component (EC) of the working fluid is oxidized; the cathode 210, where the electrochemically active component EC of the working fluid is reduced; and an electrolyte 215 that serves to conduct the ionic species ($EC^+$) from the anode 205 to the cathode 210. The electrolyte 215 can be an impermeable solid ion exchange membrane having a porous microstructure and an ion exchange material impregnated through the membrane such that the electrolyte 215 can withstand an appreciable pressure gradient between its anode and cathode sides. The examples provided here employ impermeable ion exchange membranes, and the electrochemically active component of the working fluid is remixed with the working fluid after compression and thus the pressure of the working fluid 200 is elevated prior to the condensation phase of the refrigeration process. However, a permeable ion exchange membrane is also feasible with the working fluid traversing in a unidirectional and sequential path through electrode assemblies with increasing pressure. The active components of the working fluid dissolve into the ion exchange media of the ion exchange membrane and the gas in the working fluid traverses through the ion exchange membrane.

As another example, the electrolyte 215 can be made of a solid electrolyte, for example, a gel, that is, any solid, jelly-like material that can have properties ranging from soft and weak to hard and tough and being defined as a substantially dilute crosslinked system that exhibits no flow when in the steady-state. The solid electrolyte can be made very thin, for example, it can have a thickness of less than 0.2 mm, to provide additional strength to the gel. Alternatively, the solid electrolyte can have a thickness of less than 0.2 mm if it is reinforced with one or more reinforcing layers like a polytetrafluoroethylene (PTFE) membrane (having a thickness of about 0.04 mm or less) depending on the application and the ion exchange media of the electrolyte.

Each of the anode 205 and the cathode 210 can be an electrocatalyst such as platinum or palladium or any other suitable candidate catalyst. The electrolyte 215 can be a solid polymer electrolyte such as Nafion (trademark for an ion exchange membrane manufactured by the I. E. DuPont DeNemours Company) or GoreSelect (trademark for a composite ion exchange membrane manufactured by W. L. Gore & Associates Inc.). The catalysts (that is, the anode 205 and the cathode 210) are intimately bonded to each side of the electrolyte 215. The anode 205 includes an anode gas space (a gas diffusion media) 207 and the cathode 210 includes a cathode gas space (a gas diffusion media) 212. The electrodes (the anode 205 and the cathode 210) of the cell 202 can be considered as the electrocatalytic structure that is bonded to the solid electrolyte 215. The combination of the electrolyte 215 (which can be an ion exchange membrane) and the electrodes (the anode 205 and the cathode 210) is referred to as a membrane electrode assembly or MEA.

Adjacent the anode gas space 207 is an anode current collector 209 and adjacent the cathode gas space 212 is a cathode current collector 214. The anode collector 209 and the cathode collector 214 are electrically driven by the power supply 250. The anode collector 209 and the cathode collector 214 are porous, electronically conductive structures that can be woven metal screens (also available from Tech Etch) or woven carbon cloth or pressed carbon fiber or variations thereof. The pores in the current collectors 209, 214 serve to facilitate the flow of gases within the gas spaces 207, 212 adjacent to the respective electrodes 205, 210.

Outer surfaces of the collectors 209, 214 are connected to respective bipolar plates 221, 226 that provide fluid barriers that retain the gases within the cell 202. Additionally, if the cell 202 is provided in a stack of cells, then the bipolar plates 221, 226 separate the anode and cathode gases within each of the adjacent cells in the cell stack from each other and facilitate the conduction of electricity from one cell to the next cell in the cell stack of the compressor. The bipolar plate 221, 226 can be obtained from a number of suppliers including Tech Etch (Massachusetts).

Additionally, subassemblies of components of the electrochemical cell can be commercially obtained from manufacturers such as W. L. Gore & Associates Inc. under the PRIMEA trademark or Ion Power Inc. Commercially available assemblies are designed for oxygen reduction on one electrode and therefore the electrodes (the anode 205 and cathode 210) may need to be modified for hydrogen reduction.

Hydrogen reduction at the cathode 210 actually requires lower loadings of precious metal catalysts and also is feasible with alternative lower cost catalysts such as palladium. Thus, the eventual production costs of assemblies employed in the system 100 are substantially lower than typical fuel cell components.

As mentioned above, the control system 135 is coupled to the compressor 105, the first heat transfer device 110, and the second heat transfer device 115. The control system 135 is also coupled to one or more temperature sensors 125, 130, 140, 145 placed within the system 100 to monitor or measure the temperature of various features of the system 100. For example, the temperature sensor 125 can be configured to measure the temperature of the working fluid within the conduit 111 and the temperature sensor 130 can be configured to measure the temperature of the working fluid within the conduit 117. As another example, temperature sensors 140, 145 can be placed near respective heat transfer devices 110, 115 to measure the temperature at which the heat transfer device operates, to measure the temperature of the working fluid within the respective heat transfer device, or to measure the heat source fluid temperature or heat sink fluid temperature.

The control system 135 can be a general system including sub-components that perform distinct steps. For example, the control system 135 includes the power supply 250 (such as, for example, a battery, a rectifier, or other electric source) that supplies a direct current electric power to the compressor 105.

Moreover, the control system 135 can include one or more of digital electronic circuitry, computer hardware, firmware, and software. The control system 135 can also include appropriate input and output devices, a computer processor, and a computer program product tangibly embodied in a machine-readable storage device for execution by a programmable processor. The procedure embodying these techniques (discussed below) may be performed by a programmable processor executing a program of instructions to perform desired functions by operating on input data and generating appropriate output. Generally, a processor receives instructions and data from a read-only memory and/or a random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The controller 135 receives information from components (such as the temperature sensors and the compressor 105) of the system 100 and controls operation of a procedure (as discussed below) that can either maintain the heat source or the heat sink at a relatively constant temperature condition. Additionally, controlling the operation of an electrochemical compressor 105 consists of turning its current on or off through the power supply. Alternatively, the voltage applied to the electrochemical compressor 105 can be set to be in proportion to the heat source fluid temperature or the heat sink fluid temperature. In some applications, such as electric cars without internal combustion engines, there may be an advantage in operating the vehicle air conditioning system electrically and driving each wheel independently without a central motor (required to drive the air conditioning system).

The refrigeration system 100 can also include one-way valves 150, 155 at the output of the compressor 105. The one-way valve 150, 155 can be any mechanical device, such as a check valve, that normally allows fluid (liquid or gas) to flow through it in only one direction (the direction of the arrows). The valves 150, 155 ensure proper delivery of the components of the working fluid that exit the compressor 105 into the rest of the refrigeration system 100 by reducing or avoiding back-pressure into the last cell in the compressor 105, and therefore ensure unidirectional flow of the fluids (which include gases). For example, the valve 150 is placed within a conduit 152 that transports the high pressure electrochemically active component plus the small amount of water that is involved in the electrochemical process and the valve 155 is placed within a conduit 157 that transports the condensable refrigerant that bypasses the electrochemical process.

The refrigeration system 100 can also include a dryer 160 that is configured to remove water from the working fluid prior to reaching the expansion valve 120 to reduce the chance of water freezing within the valve 120 and potentially clogging the valve 120, and to increase the efficiency of the expansion process within the valve 120.

Referring also to FIG. 3A, in another implementation, the electrochemical compressor 105 includes a plurality of cells 300, 301, 302, 303 arranged in series with each other, with the first cell 300 receiving the low pressure working fluid 200 from the conduit 112 and diverting the low pressure refrigerant along conduit 305. In this implementation, only the first cell 300 diverts the low pressure refrigerant along the conduit 305. An output 310 from the first cell 300 is a higher pressure mixture of the electrochemically active component and water; the output 310 is fed into an input 311 of the second cell 301. Likewise, an output 312 from the second cell 301 is fed into an input 313 of the third cell 302, and an output 314 of the third cell 302 is fed into an input 315 of the fourth cell 303. An output 316 from the fourth cell 303 carries the high pressure mixture of the electrochemically active component and water, and this output is mixed with the diverted refrigerant in conduit 305, as discussed above, and directed along conduit 116 toward the second heat transfer device 115.

As shown in FIG. 3A, the power supply is connected to the anode and cathode collector of each of the cells 300, 301, 302, 303. In other implementations, the anode collector of the cell 300 and the cathode collector of the cell 303 are the only collectors connected to the power supply. In this case, the end plates of each cell receive all the current and the current is then "conveyed" across the cells.

Referring to FIG. 3B, in another implementation, the electrochemical compressor 105 includes a plurality of cells 320, 321, 322 arranged in series with each other, with the first cell 320 receiving the low pressure working fluid 200 from the conduit 112 and diverting the low pressure refrigerant along conduit 325. In this implementation, the low pressure refrigerant is mixed with the higher pressure mixture of the electrochemically active component and water directed through an output after each of the cells 320, 321, 322 and each of the cells 320, 321, 322 diverts the low pressure refrigerant. Thus, output 330 from the first cell 320 is a higher pressure mixture of the electrochemically active component and water and this mixture is mixed with the diverted low pressure refrigerant traveling in the conduit 325 to form a mixture of the higher pressure electrochemically active component, the water, and the refrigerant that is directed to an input 331 of the second cell 321. An output 333 from the second cell 321 is a higher pressure mixture of the electrochemically active component and water and this mixture is mixed with the diverted low pressure refrigerant traveling in conduit 332 to form a mixture of the higher pressure electrochemically active component, the water, and the refrigerant that is directed to an input 334 of the third cell 322. Lastly, an output 336 from the third cell 322 is a higher pressure mixture of the electrochemically active component and water and this mixture is mixed with the diverted low pressure refrigerant traveling in conduit 335 to form a mixture of the higher pressure electrochemically active component, the water, and the refrigerant that is directed along conduit 116 toward the second heat transfer device 115.

As shown in FIG. 3B, the power supply is connected to the anode collector of the first cell 320 and to the cathode collector of the third cell 322. In this case, the end plates of each cell receive all the current and the current is then "conveyed" across the cells. In other implementations, the anode collector and cathode collector of each of the cells 320, 321, 322 are connected to the power supply.

Referring to FIG. 3C, in another implementation, the electrochemical compressor 105 includes a plurality of cells 350, 351, 352, 353 arranged in parallel with each other, with each of the cells 350, 351, 352, 353 receiving the low pressure working fluid 200 from the conduit 112 and each of the cells 350, 351, 352, 353 diverting the low pressure refrigerant along respective conduits 360, 361, 362, 363. In this implementation, the low pressure refrigerant from each of the cells 350, 351, 352, 353 is mixed together and passed through conduit 364, and the high pressure mixture of the electrochemically active component and water directed through respective outputs 370, 371, 372, 373 of each of the cells 350, 351, 352, 353 is mixed together and passed through conduit 374. These two mixtures in the conduits 364 and 374 are combined with each other and directed along the conduit 116 toward the second heat transfer device 115.

The power supply can be connected to the anode collector and to the cathode connector of each of the cells 350, 351, 352, 353.

While three or four cells are shown in these drawings, it is noted that any number of cells can be used in the compressor 105, and the number of cells can be selected depending on the cooling application of the system 100.

Referring also to FIG. 4A, the system 100 performs a procedure 400 for transferring heat from the heat source at the first heat transfer device 110 to the heat sink at the second heat transfer device 115.

Low pressure working fluid 200 (which is typically a gas mixture of hydrogen, condensable refrigerant, and water) enters compressor 105 (step 405). A mixture of hydrogen and water is dissociated from the condensable refrigerant (step 410). In particular, the hydrogen (in the form of a proton) and water dissolve into the ion exchange media while the condensable refrigerant does not. The condensable refrigerant is diverted along a path separate from the electrochemical path through the membrane electrode assembly (step 415). The dissociated mixture is then pumped across the membrane electrode assembly of each cell in the compressor 105 (step 420). In particular, electrons are stripped from the hydrogen in the hydrogen/water mixture at the anode collector of the cell, and the hydrogen ions are transported across the anode, electrolyte, and toward the cathode due to the electrical potential applied across the collectors from the power supply. Additionally, the hydrogen ion gas is pressurized across the membrane electrode assembly. Next, the hydrogen ions are recombined with the electrons at the cathode collector to reform hydrogen gas at a higher pressure, and this higher pressure hydrogen gas is recombined with the diverted condensable refrigerant to thereby raise the pressure of the working fluid (step 430).

Thus, the electrochemical compressor 105 raises the pressure of the working fluid 200 and delivers the higher pressure working fluid 200 to the second heat transfer device (the condenser) 115 where the condensable refrigerant is precipitated by heat exchange with the sink fluid (step 435). The working fluid is then reduced in pressure in the expansion valve 120 (step 440). Subsequently, the low pressure working fluid is delivered to the first heat transfer device (the evaporator) 110 where the condensed phase of the working fluid is boiled by heat exchange with the source fluid (step 445). The evaporator effluent working fluid may be partially in the gas phase and partially in the liquid phase when it is returned from the evaporator to the electrochemical compressor 105. In the process, heat energy is transported from the evaporator to the condenser and consequently, from the heat source at a relatively lower temperature to the heat sink at relatively higher temperature.

Referring also to FIG. 4B, concurrently with the procedure 400, the control system 135 performs a procedure 450 for controlling the amount of electrical potential applies to the current collectors of the compressor 105, and therefore also controls the amount of heat energy transported from the evaporator to the condenser. The control system 135 receives information from the one or more sensors (for example, temperature or pressure sensors) in the system 100 indicating physical characteristics (such as temperature or pressure) at key locations of the system 100 (step 455). The control system 135 analyzes the information (step 460) and determines whether physical properties of the system 100 need to be adjusted based on the analyzed information (step 465). For example, the control system 135 can determine that a current applied to the compressor 105 (and therefore the current applied to the electrode collectors) needs to be adjusted. As another example, the control system 135 can determine that a flow rate of one or more of the heat sink fluid and the heat source fluid that transport heat from and to the devices 115, 110 needs to be adjusted. If the control system 135 determines that a physical property of the system 100 should be adjusted, then the control system 135 sends a signal to the component that is affected to adjust the particular property (step 470). For example, the control system 135 can send a signal to the power supply to adjust the amount of current applied to the current collectors in the compressor 105. Otherwise, the control system 135 continues to receive information from the one or more sensors (step 455).

In summary, the system 100 includes an electrochemical cell of the compressor 105 that compresses an electrochemically active component of the working fluid, and remixes the compressed (at high pressure) electrochemically active component (the first component) with the condensable refrigerant (the second component) to elevate the pressure of the mixed gas working fluid in a vapor compression refrigeration cycle. In this way, the electrochemical compressor 105 is capable of producing high pressure hydrogen gas from a mixed component working fluid having an electrochemically active component such as, hydrogen and at least one condensable refrigerant. In this arrangement, hydrogen is compressed to a much higher pressure than the final working fluid pressure (that is, the pressure of the remixed working fluid), and because of this, the hydrogen when mixed with the lower pressure condensable refrigerant is at the required higher pressure. The exact pressure requirements for the hydrogen stream depends on the volume of condensable refrigerant being pressurized in relation to the volume of hydrogen, the desired final pressure requirements of the remixed working fluid, and the targeted energy efficiency. The check valves 150, 155 are employed to make sure the gas flows are maintained in the intended directions and that no back flow is allowed towards the cells of the compressor 105.

The energy efficiency of the system 100 depends on the available surface area of the anode 205 and the cathode 210, and the current density and operating voltage applied to the cells from the power supply. Higher current densities result in greater the resistive losses for the system 100.

The size reduction of the compressor 105 is feasible because of its cellular design, and because it is operating using an electrochemical process. If an application requires significant size reductions, the electrode (the anode and the cathode) surfaces can be reduced, the applied current densities and voltages can be increased, and as a result a smaller mass of cells can be employed in the compressor 105. This would result in an almost order of magnitude reduction in size and weight for the system 100 compared to conventional mechanical systems.

Since cooling capacity is linked to applied current and voltage, one advantage of this system is that it can more easily modulate from low capacity (that is, low current density at a specific voltage) to a high capacity. A system 100 designed to operate at high capacities actually becomes more efficient at lower utilizations, while, the opposite is true for mechanical systems.

Figure 5:
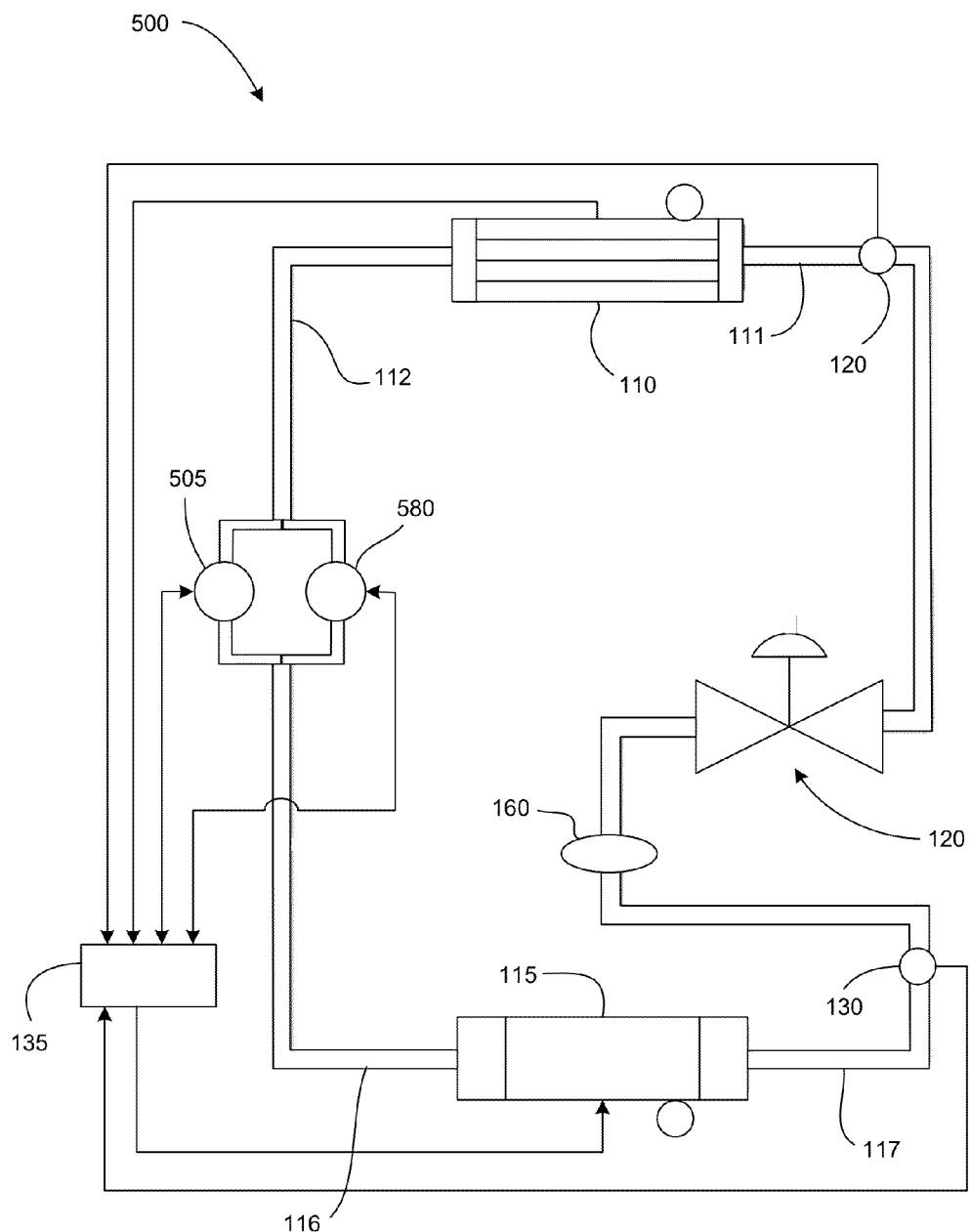
FIG. 5 is a block diagram of an exemplary refrigeration system that defines a closed loop that contains a working fluid and includes an electrochemical compressor and a mechanical compressor in parallel with each other.
Figure 6:
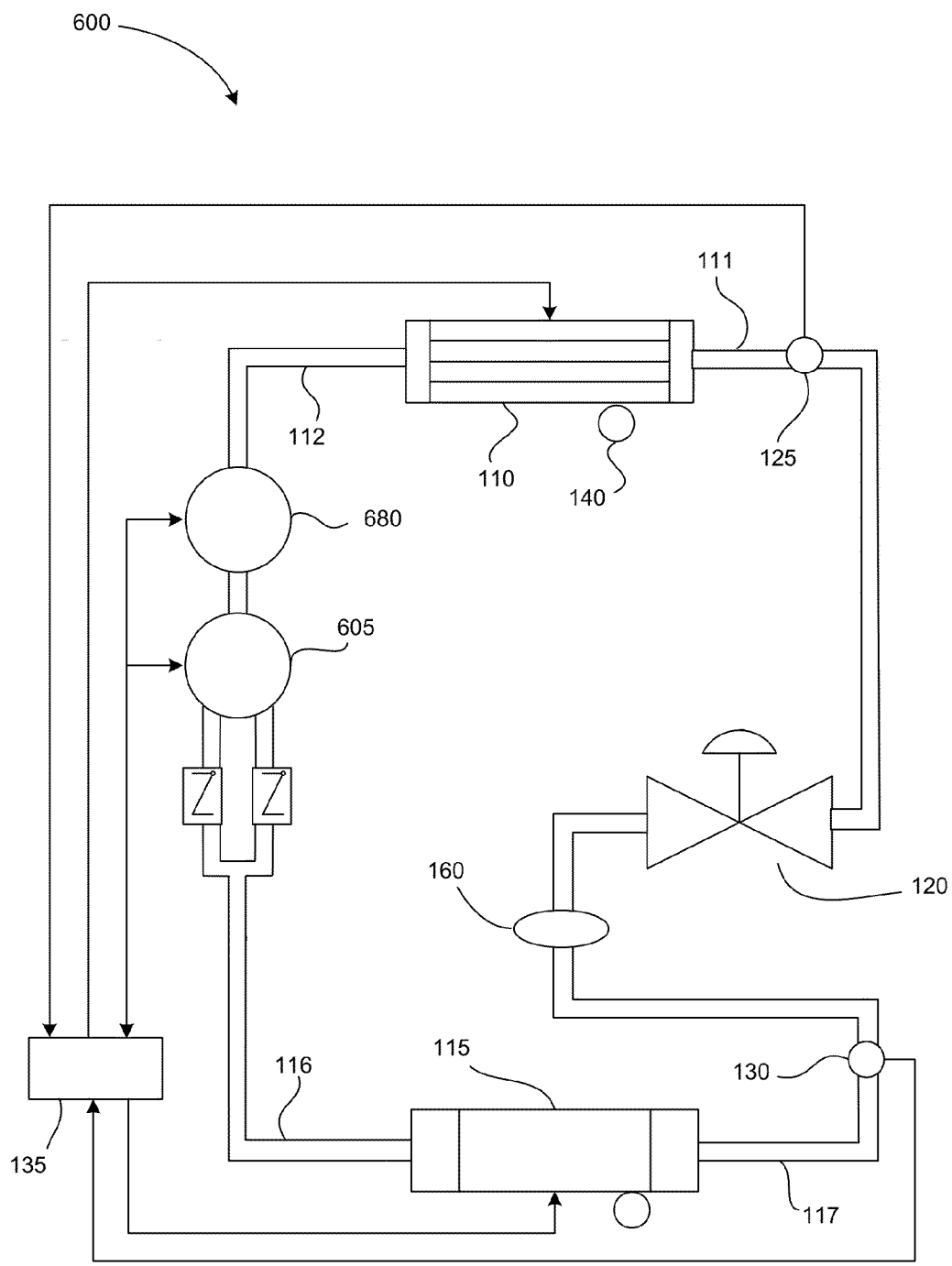
FIG. 6 is a block diagram of an exemplary refrigeration system that defines a closed loop that contains a working fluid and includes an electrochemical compressor and a mechanical compressor in series with each other.

Referring also to FIGS. 5 and 6, exemplary hybrid refrigeration systems 500, 600 define a closed loop that contains a working fluid and include the same components (for example, the electrochemical compressor, the heat transfer devices, and the thermostatic expansion valve) of the system 100. These systems 500, 600 also include mechanical compressors 580, 680 operating in conjunction with the electrochemical compressors 505, 605 in a hybrid fashion. Such a design is useful for use in electric vehicles, for example. The design of the systems 500, 600 provides high efficiency service at low refrigeration requirements and allows the mechanical segment of the system 500, 600 to take over at constant and higher refrigeration demands. The mechanical segment of the system 500, 600 is the segment that bypasses the electrochemical compressor 505, 605.

As shown in FIG. 5, the mechanical compressor 580 is in parallel with the electrochemical compressor 505. For simplicity, the one way valves (such as the valves 150, 155) and the separate conduits for the high pressure electrochemically active component and the condensable refrigerant (such as the conduits 152, 157) that are found at the output of the compressor 505 are omitted from this drawing. As shown in FIG. 6, the mechanical compressor 680 is in series with the electrochemical compressor 605.

The refrigeration system 100, 500, 600 can work with a wide range of condensable refrigerants. However the choice of refrigerant depends on the exact application under consideration and other external regulatory factors. Care should be taken in the selection of the refrigerant to ensure that the refrigerant does not degrade the electrochemical performance of the system 100, 500, 600 or poison the electrocatalyst employed.

An ideal refrigerant has good thermodynamic properties, is noncorrosive, stable, and safe. The desired thermodynamic properties are at a boiling point somewhat below the target temperature, a high heat of vaporization, a moderate density in liquid form, a relatively high density in gaseous form, and a high critical temperature. Since boiling point and gas density are affected by pressure, refrigerants may be made more suitable for a particular application by choice of operating pressure.

While we have described an electrochemical compressor that uses a multiple component working fluid utilizing hydrogen and that is based on a cationic exchange membrane, it is also possible to use a working fluid including chlorine as a component; such a working fluid could be used advantageously in an anionic exchange membrane cell. In an electrochemical compressor using an anionic exchange membrane, the electrochemically active component of the working fluid is first reduced at a cathode. The anions formed at the cathode migrate to the anode where they are oxidized. The gas evolved at the anode is at a higher pressure than the fluid entering the cathode. The process is the reverse of the cationic electrochemical compressor previously described above with reference to FIGS. 1-4B.

Other implementations are within the scope of the following claims.

What is claimed is:

1. A refrigeration system that conveys heat from a first heat reservoir at a relatively low temperature to a second heat reservoir at relatively high temperature, the refrigeration system defining a closed loop that contains a working fluid, at least part of the working fluid being circulated through the closed loop, the refrigeration system comprising:
   a first heat transfer device that transfers heat from the first heat reservoir to the working fluid, a second heat transfer device that transfers heat from the working fluid to the second heat reservoir, an expansion valve between the first and second heat transfer devices that reduces pressure of the working fluid, a conduit system and an electrochemical compressor between the first and second heat transfer devices;
   wherein the electrochemical compressor comprises:
   one or more electrochemical cells electrically connected to each other through a power supply, each electrochemical cell comprising a gas pervious anode, a gas pervious cathode, an electrolyte disposed between and in intimate electrical contact with the cathode and the anode;
   an electrochemical compressor input,
   an electrochemical compressor output,
   wherein at least one of said one or more electrochemical cells comprises an electrochemical compressor bypass conduit;
   wherein the working fluid comprises:
   a condensable refrigerant that bypasses the electrochemical process; and
   an electrochemically active fluid that participates in the electrochemical process within the electrochemical compressor
   wherein said conduit system receives at least one electrochemically-active fluid of said working fluid from said electrochemical compressor output and, other components of the working fluid from said electrochemical compressor bypass conduit, wherein said conduit system has a geometry that enables at least a portion of the received working fluid to be imparted with a gain in kinetic energy as it moves through the conduit system.

2. The refrigeration system of claim 1, wherein the electrolyte comprises a solid electrolyte.

3. The refrigeration system of claim 1, further comprising a temperature sensor thermally coupled to one or more of the working fluid, the first heat transfer device, and the second heat transfer device.

4. The refrigeration system of claim 1, wherein the condensable refrigerant does not participate in the electrochemical process.

5. The refrigeration system of claim 1, wherein the electrochemical compressor includes:
   a cathode gas space on a nonelectrolyte side of the cathode; and
   an anode gas space on a nonelectrolyte side of the anode.

6. The refrigeration system of claim 1, wherein the electrochemical compressor includes:
   a first electrochemically active route that traverses the anode and cathode;
   a second non-electrochemical route that bypasses the anode and cathode; and
   a combiner that combines the components that have traversed the first and second routes.

7. The refrigeration system of claim 1, wherein the first heat transfer device comprises a condenser.

8. The refrigeration system of claim 1, wherein the second heat transfer device comprises an evaporator.

9. The refrigeration system of claim 1, further comprising a mechanical compressor in series with the electrochemical compressor.

10. The refrigeration system of claim 9, wherein the mechanical compressor is between the electrochemical compressor and the first heat transfer device.

11. The refrigeration system of claim 9, wherein the mechanical compressor is between the electrochemical compressor and second heat transfer device.

12. The refrigeration system of claim 1, wherein the working fluid includes carbon dioxide.

13. The refrigeration system of claim 1, wherein the working fluid includes a fluorocarbon gas.

14. The refrigeration system of claim 1, wherein the condensable refrigerant is not water.

15. The refrigeration system of claim 1, wherein the working fluid includes water.

* * * * *